(12) United States Patent
Nevers

(10) Patent No.: US 11,635,121 B2
(45) Date of Patent: Apr. 25, 2023

(54) ACTUATOR PROVIDED WITH A FLUID-DAMPED FUSE SYSTEM, AND A VEHICLE PROVIDED WITH THE ACTUATOR

(71) Applicant: AIRBUS HELICOPTERS, Marignane (FR)

(72) Inventor: Romain Nevers, Pelissanne (FR)

(73) Assignee: AIRBUS HELICOPTERS, Marignane (FR)

( * ) Notice: Subject to any disclaimer, the term of this patent is extended or adjusted under 35 U.S.C. 154(b) by 115 days.

(21) Appl. No.: 17/201,753

(22) Filed: Mar. 15, 2021

(65) Prior Publication Data
US 2021/0372500 A1    Dec. 2, 2021

(30) Foreign Application Priority Data
May 29, 2020    (FR) ...................................... 2005674

(51) Int. Cl.
| | | |
|---|---|---|
| *F16F 9/14* | (2006.01) | |
| *B64C 13/04* | (2006.01) | |
| *B64C 13/50* | (2006.01) | |
| *F16D 9/06* | (2006.01) | |

(52) U.S. Cl.
CPC .............. *F16F 9/145* (2013.01); *B64C 13/04* (2013.01); *B64C 13/50* (2013.01); *F16D 9/06* (2013.01); *F16F 2222/12* (2013.01); *F16F 2230/0023* (2013.01); *F16F 2232/02* (2013.01); *F16F 2236/08* (2013.01)

(58) Field of Classification Search
CPC .................. F16F 9/145; F16F 2222/12; F16F 2230/0023; F16F 2232/02; F16F 2236/08; B64C 13/04; B64C 13/50; F16D 9/06
See application file for complete search history.

(56) References Cited

U.S. PATENT DOCUMENTS

| | | | |
|---|---|---|---|
| 2005/0236241 A1 | 10/2005 | Dusserre-Telmon et al. | |
| 2009/0159382 A1* | 6/2009 | Chemouni | F16F 9/145 188/290 |
| 2009/0283642 A1 | 11/2009 | Gemmati et al. | |

(Continued)

FOREIGN PATENT DOCUMENTS

| | | |
|---|---|---|
| AU | 412907 A1 | 4/1971 |
| DE | 19519105 A1 | 11/1996 |

(Continued)

OTHER PUBLICATIONS

French Search Report for French Application No. FR2005674, Completed by the French Patent Office, dated Nov. 16, 2020, 7 pages.

*Primary Examiner* — Rodney A Bonnette
(74) *Attorney, Agent, or Firm* — Brooks Kushman P.C.

(57) ABSTRACT

An actuator provided with a motor for moving an output arrangement, the actuator including both an output lever and a fusible connection that acts up to a mechanical torque threshold to constrain the output arrangement and the output lever to move together in rotation about an axis of rotation. The actuator also includes a fluid damper device housed between the output lever and the output arrangement to act, following rupture of the fusible connection, to damp movement of the output lever relative to the output arrangement in rotation about the axis of rotation.

20 Claims, 3 Drawing Sheets

(56) References Cited

U.S. PATENT DOCUMENTS

| | | |
|---|---|---|
| 2010/0203974 A1 | 8/2010 | Jaenker |
| 2011/0031346 A1 | 2/2011 | Allieta et al. |
| 2014/0145128 A1 | 5/2014 | Durand et al. |
| 2014/0374531 A1 | 12/2014 | Laube et al. |
| 2015/0014480 A1 | 1/2015 | Lebernicheux et al. |
| 2018/0093757 A1* | 4/2018 | Honnorat ................ B64C 13/04 |
| 2019/0256196 A1* | 8/2019 | Dinger ...................... F16D 9/06 |
| 2020/0096074 A1* | 3/2020 | Orita ....................... F16F 9/369 |
| 2020/0269969 A1 | 8/2020 | Honnorat |

FOREIGN PATENT DOCUMENTS

| | | |
|---|---|---|
| EP | 1506354 A1 | 2/2005 |
| EP | 2266878 A1 | 12/2010 |
| EP | 3135528 A1 | 3/2017 |
| EP | 3702278 A1 | 9/2020 |
| FR | 2931131 A1 | 11/2009 |
| FR | 2998725 A1 | 5/2014 |
| FR | 3008457 A1 | 1/2015 |
| WO | 2003100288 A1 | 12/2003 |
| WO | 2019183439 A1 | 9/2019 |

* cited by examiner

ACTUATOR PROVIDED WITH A FLUID-DAMPED FUSE SYSTEM, AND A VEHICLE PROVIDED WITH THE ACTUATOR

CROSS REFERENCE TO RELATED APPLICATIONS

This application claims priority to French patent application No. of FR 20 05674 filed on May 29, 2020, the disclosure of which is incorporated in its entirety by reference herein.

BACKGROUND OF THE INVENTION

(1) Field of the Invention

The present invention relates to an actuator provided with a fluid-damped fuse system, and to a vehicle provided with the actuator.

(2) Description of Related Art

Specifically, an aircraft, and more particularly a helicopter, may include actuators that are arranged in parallel or in series with flight control transmission systems. Actuators arranged in parallel with a flight control transmission system are usually referred to as "trim" actuators.

For example, the aircraft may include a pilot-operable flight control that is connected to a control member of the aircraft via a flight control linkage. By way of example, a control member of an aircraft may comprise a blade of a lift rotor, or a blade of a yaw control rotor, or a flap or the equivalent. Under such circumstances, at least one series actuator may be incorporated in the flight control linkage, and a trim actuator may be connected to the flight control linkage.

For example, a trim actuator may include a motor provided with a rotor and a stator, the rotor being connected to an output lever engaged with the flight control linkage.

When the motor is operated, the output lever turns and moves at least one member of the flight control linkage.

If a pilot operates a flight control, the flight control linkage also causes the output lever to turn. Under normal conditions, the trim actuator does not block the flight control linkage, and for example the rotor of the motor turns relative to the stator of the motor.

Nevertheless, if a trim actuator does jam, the entire flight control linkage may be prevented from moving.

In order to prevent a jammed trim actuator from blocking the associated flight control linkage, a trim actuator may include a decoupling system enabling it to be disengaged from the flight control linkage, if necessary.

Such a decoupling system may include a fuse system designed to break when the trim actuator is jammed and the pilot voluntarily applies a large force to the flight control.

In an example, a trim actuator may comprise a motor turning an output shaft via an internal mechanical power transmission. Under normal conditions, the output shaft is constrained to turn with an output lever by means of a fuse pin. The output lever is mechanically connected to the associated flight control linkage. In normal operation, the pin serves to transmit mechanical torque between the output lever and the motor. In contrast, in the event of the trim actuator jamming as a result of an internal failure of the trim actuator, the pilot senses physically that the flight control linkage is blocked. The pilot then exerts a greater force on the flight control. When the rupture threshold of the pin is reached, the pilot's action on the flight control causes the pin to break in shear. In the resulting new configuration, the output lever is free to turn relative to the jammed output shaft. The pilot can thus once again cause the flight control linkage to move.

Although satisfactory, that solution involves difficulty in designing the pin so that its rupture threshold is neither too low in order to ensure that the pin is strong enough not to break over the entire flight envelope, nor too high in order to ensure that any pilot has the physical strength to be able to produce the force necessary for breaking the pin.

The force the pilot needs to exert in order to break the pin must therefore be quite large. Thereafter, the pin snaps suddenly. Under such circumstances, when the pin snaps, the flight control linkage tends to move quickly and can reach abutments. By way of example, the output lever may then move at a speed of approximately 300 degrees per second (°/s). The flight control linkage moving quickly over its entire amplitude can give rise to damage.

In order to remedy that, Document FR 2 931 131 describes a trim actuator having a retractable coupling device. That coupling device is provided with locking means together with compression means and drive transmission means, e.g. at least one ball. In a normal configuration, each ball constrains the locking means and the compression means to move together in rotation. For this purpose, the locking means are provided with a first housing that is discontinuous and that receives said drive transmission means below a mechanical torque threshold. The locking means also include a groove-type second housing that is continuous and that describes a closed loop. The coupling device is provided with means for moving each ball in irreversible manner and without human intervention from the first housing to the second housing when the mechanical torque exerted on the balls is greater than said predetermined torque. The balls then roll in the groove without transmitting mechanical torque.

That Document FR 2 931 131 describes an advantageous torque limiter type system. In contrast, after jamming, that system requires human intervention in order to replace the balls in the first housing.

Another solution consists in using an electromagnetic system having an electric coil. Such a system is advantageous, but presents weight and size that are considerable.

Document FR 3 008 457 and Document US 2010/0203974 are also known.

Document FR 3 008 457 describes a coupling mechanism between a control member for generating manual flight commands and a trim actuator forming part of a flight control linkage of an aircraft. The coupling mechanism comprises axial engagement means between a lever arm mechanically linked to the control member and a pivot shaft of the trim actuator.

Document US 2010/0203974 describes a motorized spindle drive device including a coupling that disengages on a predefined mechanical torque threshold being exceeded.

Documents EP 1 506 354, EP 2 266 878, and EP 3 702 278 are also known.

BRIEF SUMMARY OF THE INVENTION

An object of the present invention is thus to propose an innovative actuator provided with a fusible connection serving to limit the speed with which a mechanical movement transmission linkage moves as a result of the fusible member breaking.

Thus, the invention provides an actuator provided with a motor for moving an output arrangement, said actuator including both an output lever and a fusible connection that acts up to a mechanical torque threshold to constrain said output arrangement and said output lever to move together in rotation about an axis of rotation.

The output arrangement and the motor can co-operate with each other in conventional manner, e.g. within a trim actuator.

The actuator also includes a fluid damper device housed between the output lever and the output arrangement to act following rupture of said fusible connection to damp movement of said output lever relative to the output arrangement in rotation about said axis of rotation.

The term "output arrangement" designates a device that either comprises solely an output shaft that is incorporated in the motor or that is connected via a mechanical drive internal to the motor, or else comprises an assembly that includes such an output shaft. By way of example, such an assembly may comprise such an output shaft together with a support arranged around the output shaft and connected to said output shaft at least so as to be constrained to move in rotation therewith.

Under such circumstances, in a non-accidental configuration, the output arrangement and the output lever are movable together in rotation about the axis of rotation via the fusible connection.

In contrast, in a degraded configuration in which the motor and/or any internal mechanical transmission is/are jammed, the output arrangement is prevented from moving in rotation relative to the axis of rotation. However, by increasing the force exerted on the output lever, it is possible for a person to break the fusible connection.

Within a conventional actuator, the output lever then moves very quickly. In contrast, the invention makes provision for a fluid damper device between the output lever and the output arrangement. The fluid damper device provides fluidic limiting of the travel speed of the output lever following rupture of the fusible connection, e.g. substantially by a factor of three compared with the prior art. Together, the fusible connection and the fluid damper device form a fusible system with fluid damping.

Within a flight control system of an aircraft, this fluid damper device can serve to avoid reaching abutments following rupture of the fusible connection. The fluid damper device can tend to limit the effects of rupture of the fusible connection on the flight control system.

This actuator is also found to be relatively simple, with the impact of the fluid damper device in terms of weight or cost being moderate.

The actuator of the invention may include one or more of the following characteristics, taken singly or in combination.

In one aspect, the actuator may include a leaktight chamber filled with a fluid of said fluid damper device, said chamber extending radially relative to the axis of rotation between the output arrangement and a wall of a housing of the output lever.

The fluid damper device thus comprises a fluid arranged in a chamber provided in the output lever. In the degraded configuration, the fluid damper device is configured to generate a force that is proportional to the travel speed of the fluid in the chamber, which force opposes movement of the output lever relative to the output arrangement.

In one aspect, the fluid is a liquid.

In one aspect, the fluid is a viscous fluid. For example, the fluid is oil.

In an aspect compatible with the above aspects, the fluid damper device may include at least one stationary vane constrained to move in rotation with the output arrangement, and at least one movable vane constrained to move in rotation with said housing, said at least one stationary vane and said at least one movable vane being arranged in said chamber and being immersed in said fluid.

Each vane secured to the output arrangement is referred to as "stationary" because it does not move in the degraded configuration, unlike each vane secured to the lever. This convention is used below to distinguish between the ends of the vanes.

The movable vane(s) serve(s) to cause the fluid to move in the chamber during relative movement in rotation between the output lever and the output arrangement.

In one aspect, said at least one stationary vane is arranged in a slot of said output arrangement.

Depending on the embodiment, the stationary vane may be engaged in a slot of the output arrangement in order to be secured to the output arrangement.

In an aspect compatible with the above aspects, said at least one stationary vane and/or said at least one movable vane include(s) at least one opening passing through it, said fluid passing through said at least one opening in the event of the output lever turning relative to the output arrangement.

The term "said at least one stationary vane and/or said at least one movable vane include(s) at least one opening" means that, depending on the variant, the movable vane(s) and/or the stationary vane(s) have/has at least one opening. Thus, there are three possible configurations: at least one movable vane, or indeed each movable vane, includes at least one opening while no stationary vane includes an opening; or at least one stationary vane or indeed each stationary vane includes at least one opening while no movable vane includes an opening; or else at least one stationary vane includes at least one opening and at least one movable vane includes at least one opening.

Fluid passing through the opening(s) serves to generate head loss that gives rise to the desired damping force by throttling.

In an aspect compatible with the above aspects, said at least one opening may pass through said at least one movable vane or said at least one stationary vane in a direction that is tangential to a circle centered on the axis of rotation.

In an aspect compatible with the above aspects, said at least one opening may have a section that extends radially relative to said axis of rotation.

In an aspect compatible with the above aspects, said at least one stationary vane may extend from the output arrangement to a stationary free end spaced apart from said wall of the housing by first radial clearance, and said at least one movable vane extends from said wall to a movable free end spaced apart from the output arrangement by second radial clearance.

In an aspect compatible with the above aspects, the fluid damper device includes at least two said stationary vanes and at least two said movable vanes, each movable vane being arranged between two stationary vanes in azimuth relative to said axis of rotation, and each stationary vane being arranged between two movable vanes in azimuth relative to said axis of rotation.

The numbers of stationary and movable vanes and of openings, and their positioning, may be determined in particular in order to guarantee that no movable vane is blocked by a stationary vane.

In an aspect compatible with the above aspects, said housing may comprise a hub closed by a cover.

The hub and the cover may co-operate with each other in order to define the chamber, i.e. in order to form walls surrounding the chamber. A fluid leak preventer, e.g. such as a gasket, may be arranged between the housing and the cover.

In an aspect compatible with the above aspects, said output lever may comprise at least one arm secured to said housing.

The output lever may comprise one or more arms for connecting to a linkage, e.g. a flight control linkage, or to a connecting rod, via a connection that has at least one degree of freedom to move in rotation, such as a pivot type connection or a ball-joint type connection, for example. For this purpose, the arm may extend from the housing to an end segment that includes a hole suitable for co-operating with such a pivot or ball-joint type connection, for example.

In an aspect compatible with the above aspects, said fusible connection may comprise a fusible pin inserted in a first passage in said output arrangement, said pin being inserted in a second passage in said housing. For example, said pin may extend parallel to the axis of rotation, or it may extend in some other direction.

For example, the output arrangement may comprise a plate that is orthogonal to the axis of rotation and that is constrained by the pin to move in rotation relative to the output lever.

In addition to an actuator, the invention provides a vehicle provided with such an actuator.

For example, the actuator is connected to a pilot-operable flight control linkage that extends from a flight control operable by a pilot to a control member of the vehicle, movement of the control member under drive from the flight control giving rise to movement of the vehicle.

BRIEF DESCRIPTION OF THE DRAWINGS

The invention and its advantages appear in greater detail in the context of the following description of embodiments given by way of illustration and with reference to the accompanying figures, in which.

DETAILED DESCRIPTION OF THE INVENTION

Elements that are present in more than one of the figures are given the same references in each of them.

Figure 1:
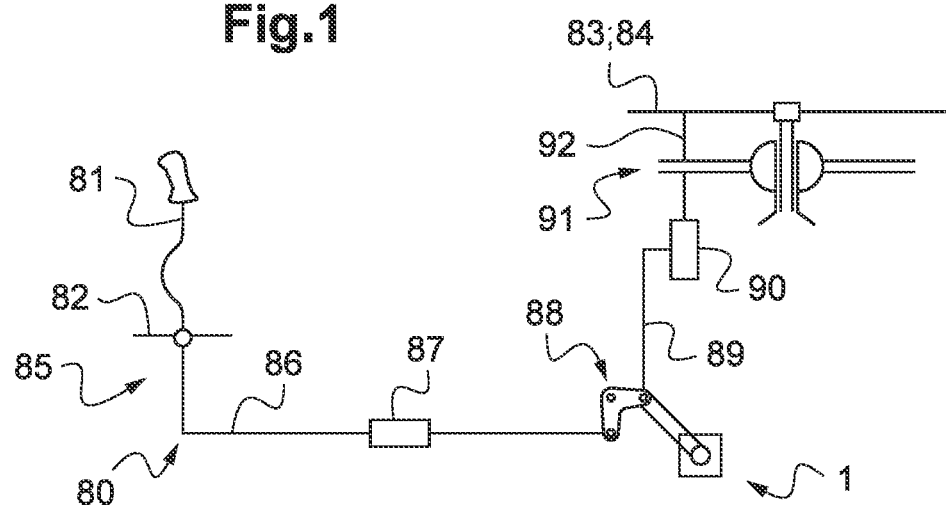
FIG. 1 is a diagram showing an actuator of the invention co-operating with a mechanical system.

FIG. 1 shows an actuator 1 of the invention arranged within a mechanical system.

For example, the actuator 1 is arranged within a mechanical system of a vehicle 80 between a human-operated control and a control member of the vehicle 80.

In the particular example of FIG. 1, the vehicle 80 is an aircraft that includes a flight control 81. In this embodiment, the flight control 81 comprises a stick that is movable relative to a floor 82. The flight control 81 is used to operate a control member 83 such as a blade 84, optionally via a control architecture that includes an actuator 1 of the invention.

By way of illustration, the flight control 81 is connected by a transmission system 85 for transmitting an order to the control member 83. The transmission system 85 may be a mechanical flight control linkage, e.g. comprising at least a first connecting rod 86 linking the flight control 81 to a series actuator 87 connected to a crank 88. The crank 88 is mechanically connected to a servocontrol 90 via at least one second connecting rod 89. The servocontrol 90 is also secured to a non-rotary swashplate of a set 91 of swashplates, the rotary swashplate of the set 91 of swashplates being connected to the blades 84 via respective pitch rods 92. Under such circumstances, the actuator 1 of the invention may be a trim actuator arranged in parallel with the linkage 85 for transmitting an order, e.g. being connected to one of the branches of the crank 88, either directly or else via at least one connecting rod.

Although FIG. 1 shows an actuator 1 of the invention arranged within a flight control system, such an actuator 1 may be arranged within a variety of systems without going beyond the ambit of the invention, e.g. within a vehicle of some other type, within an assembly line in a factory, and more generally within any system that requires an actuator with a fusible section.

Figure 2:
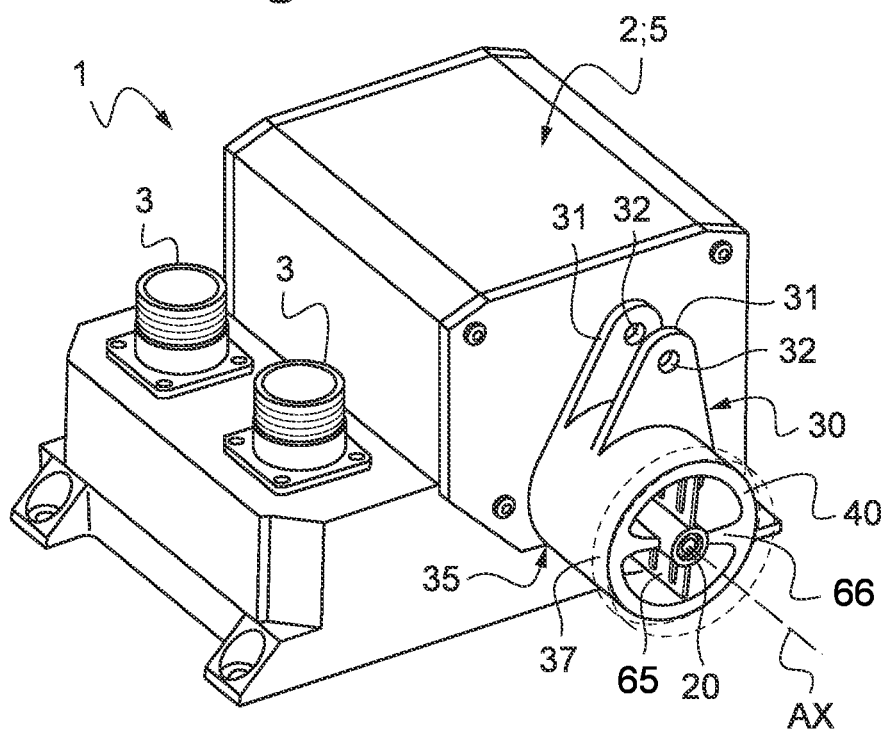
FIG. 2 is a three-dimensional view of an actuator of the invention.

Regardless of the system within which the actuator 1 is arranged, FIG. 2 shows such an actuator 1 of the invention that is of rotary type.

The actuator 1 is provided with a motor 5 configured to move an output lever 30 via an output arrangement 20, and in particular to cause it to turn about an axis of rotation AX in the example shown. Furthermore, the output lever 30 may include a member for linking to a mechanical linkage. Thus, the output lever 30 may comprise at least one arm 31 extending from a housing 35 in a direction going away from the output arrangement 20. Each arm 31 may include an end segment having a hole 32 suitable for co-operating with a pivot type link element or with a ball-joint type link element.

For example, the motor 5 is housed in a casing 2. The output arrangement 20 may extend from inside the casing 2 to outside the casing 2, with the output lever 30 being arranged at least in part outside the casing 2. Furthermore, the actuator 1 may include at least one electrical connector 3 situated at least in part outside the casing 2, with at least one electrical connector 3 being connected to the motor 5. The actuator 1 may also include at least one conventional sensor that is not shown in order to avoid overcrowding the figures.

Figure 3:
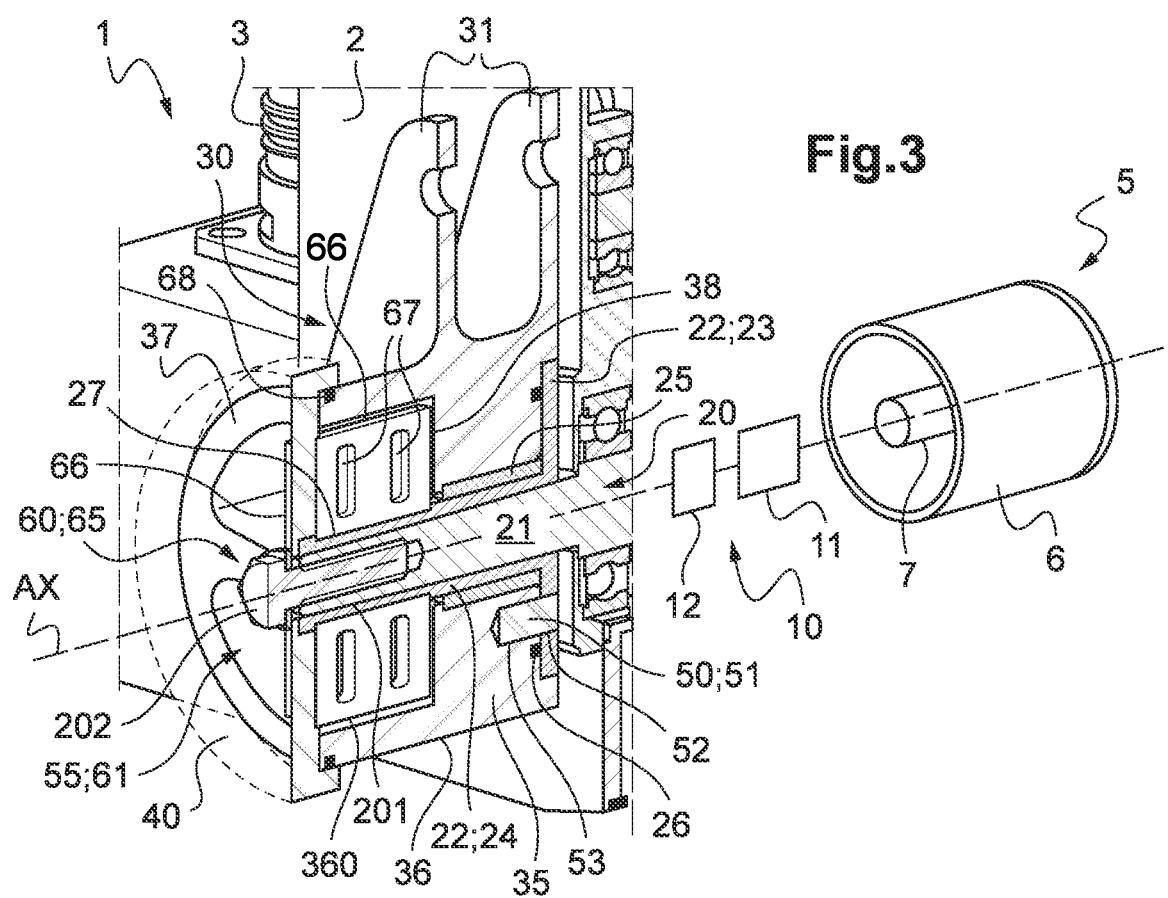
FIG. 3 is a fragmentary section view of the FIG. 2 actuator.

FIG. 3 is a section view of the output lever 30 and of the output arrangement 20, with certain conventional members of the actuator 1 being shown diagrammatically.

Thus, by way of example, the motor 5 may be an electric motor comprising a stator 6 and a rotor 7. The rotor 7 is mechanically connected to the output arrangement 20.

By way of example, the output arrangement 20 may comprise an output shaft 21. Consequently, the output shaft 21 may project from the motor 5 and be secured to the rotor 7, or it may be a component part of the rotor 7. Alternatively, the actuator 1 includes a mechanical transmission 10 connecting the motor 5, and for example the rotor 7, to the output shaft 21 of the output arrangement 20. By way of example, and without going beyond the ambit of the invention, such a mechanical transmission 10 may comprise at least one gear 11, optionally within a speed-reduction system, at least one spring 12 serving to generate a force relationship, at least one sensor.

Under such circumstances, the motor 5 is configured to turn the output arrangement 20 about the axis of rotation AX.

Furthermore, the actuator 1 includes a fusible connection 50 that acts under normal conditions of operation to constrain the output arrangement 20 and the output lever 30 to move together in rotation about the axis of rotation AX. When torque is exerted on the output lever 30, and so long as that torque is lower than a mechanical torque threshold, the fusible connection 50 performs its function and constrains the output arrangement 20 and the output lever 30 to move together in rotation about the axis of rotation AX. In contrast, when the mechanical torque threshold is reached, the fusible connection 50 breaks and ceases to constrain the output arrangement 20 and the output lever 30 to move together in rotation about the axis of rotation AX.

In the example shown, the fusible connection 50 comprises a fuse pin 51. The pin 51 extends both in a first passage 52 in the output arrangement 20 and also in a second passage 53 in the output lever 30.

In the example shown, the output arrangement 20 may comprise the above-mentioned output shaft 21 together with a support 22 arranged around the output shaft 21. By way of example, the support 22 is constrained to rotate with the output shaft 21 via conventional members, e.g. fluting. For example, the support 22 includes a disk 23 having the first passage 52. For example, the disk 23 is arranged substantially orthogonally relative to the axis of rotation AX. Under such circumstances, the first and second passages 52 and 53 together with the pin 51 may have a common axis of revolution parallel to the axis of rotation AX. In this example, when the pin 51 is in position, it is parallel to the axis of rotation AX.

Optionally, the disk 23 may be secured to a cylinder 24 of the support 22 so that the cross-section of the support 22 is generally T-shaped. By way of example, the disk 23 is then positioned axially on the axis of rotation AX between the cylinder 24 and the motor 5.

Alternatively, the output shaft 21 may include a shoulder provided with the first passage 52, or with any other system capable of cooperating with the pin 51.

Whatever the variant, under normal conditions of operation, the output lever 30 and the output arrangement 20 are constrained to move together in rotation about the axis of rotation AX by the fusible connection 50.

In another aspect, the actuator 1 includes a fluid damper device 60 that comes into action outside such normal conditions of operation.

In the event of said fusible connection 50 breaking, the fluid damper device 60 co-operates with the output lever 30 and with the output arrangement 20 in order to damp movement of the output lever 30 relative to the output arrangement 20 in turning about the axis of rotation AX.

The fluid damper device 60 may be housed between the output lever 30 and the output arrangement 20.

By way of example, the fluid damper device 60 may include a fluid 61 contained in a leaktight chamber 55 that is present between the output lever 30 and the output arrangement 20. In particular, the chamber 55 may be arranged radially, i.e. relative to the axis of rotation AX, between a wall 37 of the output lever 30 and the output arrangement 20, i.e. the output shaft 21 or the support 22, depending on the embodiment. The fluid may be liquid and/or viscous.

For this purpose, the output lever 30 may include a housing 35 in which the chamber 55 is located. The housing 35 is provided with the wall 37 that surrounds the output arrangement 20 and the chamber 55 locally.

The housing 35 may include a hollow hub 36 that is engaged on the output arrangement 20. The or each arm 31 then projects from the hub 36.

Also, the hub 36 includes an end wall 38 in the form of a ring through which there passes the output arrangement 20, i.e. the output shaft 21, and also the cylinder 24 of the support 22, were present. This end wall 38 may include the second passage 53. In order to make the chamber 55 leaktight, an end gasket 26 is arranged between the end wall 38 and the output arrangement 20, specifically between the end wall 38 and the disk 23 of the support 22 in the example shown. The axis of rotation AX may be an axis of symmetry for the end gasket 26. A bearing 25 may be arranged radially between the end wall 38 and the output arrangement 20, i.e. between the end wall 38 and the output shaft 21, or between the end wall 38 and the cylinder 24 of the support 22, when present.

The hub 36 also includes a cylinder 360 formed by the wall 37. The wall 37 extends around the axis of rotation AX of the end wall 38, going towards a free end 201 of the output arrangement 20. The wall 37 can then reach a cover 40. In FIGS. 3 and 2, the cover 40 is shown as being transparent. A cover gasket 68 may be arranged between the cover 40 and the hub 36. In the example shown, the cover 40 may have a bolt 202 passing therethrough and screwed into the free end 201 of the output arrangement 20, and specifically into the output shaft 21. Optionally, the cover 40 may present a degree of freedom to move in rotation about the axis of rotation AX relative to the hub 36 or to the output arrangement 20.

Consequently, the chamber 55 is made at least hydraulically leaktight by the end gasket 26 and by the cover gasket 68, in particular. Furthermore, relative to the axis of rotation AX, the chamber 55 extends radially between the output arrangement 20 and the wall 37 of the output lever 30 and axially between the cover 40 and the end wall 38, and also the bearing 25, if any.

Figure 4:
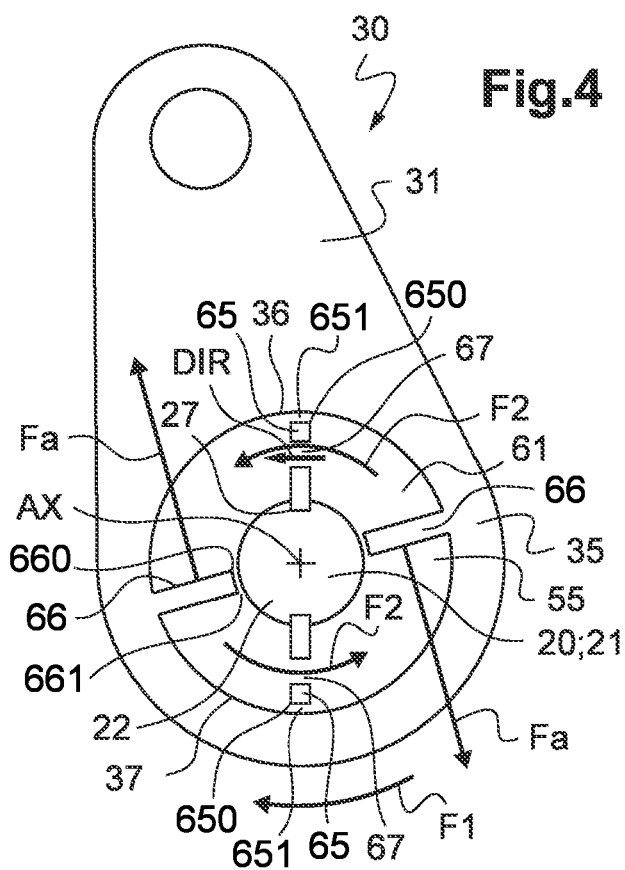
FIG. 4 is a diagram illustrating the operation of an actuator of the invention.

In another aspect, the fluid damper device 60 may include at least one stationary vane 65 that is constrained to move in rotation with the output arrangement 20, regardless of the state of the fusible connection 50. Each stationary vane 65 is arranged in the chamber 55 and is immersed in the fluid 61. By way of example, at least one stationary vane 65 is positioned in a slot 27 of the output arrangement 20, e.g. specifically a slot 27 in the output shaft 21 and/or in the support 22, if present. At least one stationary vane 65 may extend substantially radially relative to the axis of rotation AX. Furthermore, and as shown in FIG. 4, at least one stationary vane 65 may extend from the output arrangement 20 to a stationary free end 650 that is spaced apart from said wall of the housing 35 by first radial clearance 651. The first radial clearance 651 may be minimized, and may seek merely to avoid any contact between a stationary vane 65 and the output lever 30 in order to avoid jamming.

Furthermore, the fluid damper device 60 may include at least one movable vane 66 constrained to move in rotation with the housing 35. Each movable vane 66 is arranged in the chamber 55 and is immersed in the fluid 61. For example, each movable vane 66 and the hub of the housing 35, and indeed the end wall 38 and the arm(s) 31, together form a single one-piece part. At least one movable vane 66 may extend substantially radially relative to the axis of rotation AX. At least one movable vane 66 may extend from the wall 36 to a movable free end 660 that is spaced apart from the output arrangement 20 by second radial clearance

661. The second radial clearance 661 may be minimized, and may seek merely to avoid any contact between a movable vane 66 and the output arrangement 20 in order to avoid jamming.

Likewise, first axial clearance and second axial clearance may extend axially respectively between each stationary vane 65 and the end wall 38, and between each movable vane 66 and the cover 40.

In the presence of a plurality of stationary vanes 65 and of movable vanes 66, and for example in the presence of two stationary vanes 65 and of two movable vanes 66, each movable vane 66 may be arranged in azimuth, i.e. circumferentially around the axis of rotation AX, between two stationary vanes 65. Likewise, each stationary vane 65 may be arranged in azimuth between two movable vanes 66 relative to said axis of rotation AX.

By way of example, in the presence of an even number of stationary vanes 65, the stationary vanes 65 may be arranged in pairs, with the two stationary vanes 65 of any given pair being diametrically opposite relative to the axis of rotation AX. Likewise, in the presence of an even number of movable vanes 66, the movable vanes 66 may be arranged in pairs, with the two movable vanes 66 of any given pair being diametrically opposite relative to the axis of rotation AX.

Furthermore, at least one stationary vane 65 and/or at least one movable vane 66 may include at least one opening 67 passing through it. In the example shown, all of the stationary vanes 65 have at least one opening 67, and specifically two openings 67, while the movable vanes 66 are solid and thus without any openings. In another example that is not shown, all of the movable vanes 66 have at least one opening 67, and for example two openings 67, while the stationary vanes 65 are solid and thus without any openings. It is also possible to envisage having a mixture of those two configurations.

Each opening 67 may present a flow area for the fluid 61 that is greater than the flow area to be found at the first radial clearance and/or the second radial clearance and/or the first axial clearance and/or the second axial clearance.

Each opening 67 may present a section that extends radially relative to said axis of rotation AX. For example, each opening 67 may have an axial axis of symmetry that extends radially relative to said axis of rotation AX.

Furthermore, and with reference to FIG. 4, each opening 67 passes right through the associated vane, e.g. in a direction DIR that is tangential to a circle centered on the axis of rotation AX.

Consequently, during a stage of normal operation, the output arrangement 20 and the output lever 30 are constrained to move with each other in rotation about the axis of rotation AX by the fusible connection 50.

In the event of the actuator 1 jamming internally, the output arrangement 20 is prevented from moving. A force exerted on the output lever 30 can break the fusible connection 50. The output lever 30 then turns in the direction of arrow F1 relative to the output arrangement 20. The movable vane(s) 66 cause(s) the fluid 61 to move in the chamber 55. The fluid 61 then passes through the various openings 67, if any, in the direction of arrows F2. As the fluid passes through each opening 67, that gives rise to a loss of head that is a function of half the density P of the fluid multiplied by a squared term equal to the flow rate Q of the fluid through the opening divided by a head loss coefficient A times the sectional area A0 of the opening, i.e.:

$$dp = (P/2) * (Q/(A*A0))^2$$

where "/" represents the division sign and "*" represents the multiplication sign.

The flow rate Q is itself a function of the angular velocity of the output lever 30.

This results in damping forces Fa being exerted on the movable vanes 66, thereby generating damping torque on the output lever 30 opposing the movement of the output lever 30. This damping torque is a function of the square of the speed of rotation of the output lever 30 and it limits the angular velocity of the output lever 30.

The dimensions of the opening(s) 67 and of the stationary and movable vanes 65 and 66 may be determined so as to limit the speed of rotation of the output lever 30 at the moment the fusible connection 50 breaks, and to limit the risk of reaching an abutment, if any, in a flight control system.

Figure 5:
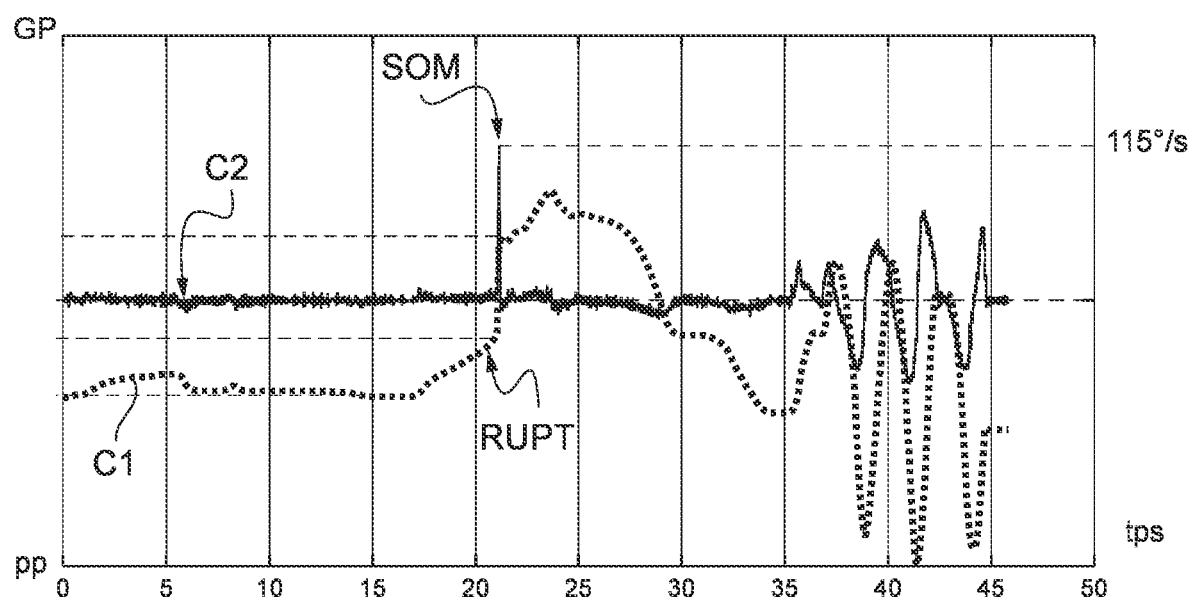
FIG. 5 is a graph illustrating the operation of an actuator of the invention.

FIG. 5 shows such a situation in a graph plotting time tps along the abscissa axis. A first curve C1 shows the movement of a flight control 81 and a second curve C2 shows the speed of rotation of the output lever 30.

At the moment of rupture RUPT, the output lever 30 turns at a speed of rotation that increases up to a moment SOM where the pilot stops applying force. The fluid damper device 60 enables this speed of rotation to be limited in comparison with a conventional actuator.

Also, the fluid damper device 60 can serve to avoid the flight control 81 reaching a bottom abutment pp or a top abutment gp.

Naturally, the present invention may be subjected to numerous variations as to its implementation. Although several embodiments are described above, it should readily be understood that it is not conceivable to identify all possible embodiments exhaustively. It is naturally possible to envisage replacing any of the means described by equivalent means without going beyond the ambit of the present invention.

What is claimed is:

1. An actuator provided with a motor for moving an output arrangement, the actuator including both an output lever and a fusible connection that acts up to a mechanical torque threshold to constrain the output arrangement and the output lever to move together in rotation about an axis of rotation; wherein the actuator includes a fluid damper device housed between the output lever and the output arrangement to act, following rupture of the fusible connection, to damp movement of the output lever relative to the output arrangement in rotation about the axis of rotation.

2. The actuator according to claim 1
wherein the actuator includes a leaktight chamber filled with a fluid of the fluid damper device, the chamber extending radially relative to the axis of rotation between the output arrangement and a wall of a housing of the output lever.

3. The actuator according to claim 2
wherein the fluid damper device includes at least one stationary vane constrained to move in rotation with the output arrangement, and at least one movable vane constrained to move in rotation with the housing, the stationary vane and the movable vane being arranged in the chamber and being immersed in the fluid.

4. The actuator according to claim 3
wherein the stationary vane is arranged in a slot of the output arrangement.

5. The actuator according to claim 3
wherein the stationary vane and/or the movable vane include at least one opening passing through it, the fluid passing through the opening in the event of the output lever turning relative to the output arrangement.

6. The actuator according to claim 5 wherein the opening passes through the movable vane or the stationary vane in a direction that is tangential to a circle centered on the axis of rotation.

7. The actuator according to claim 5 wherein the opening has a section that extends radially relative to the axis of rotation.

8. The actuator according to claim 3 wherein the stationary vane extends from the output arrangement to a stationary free end spaced apart from the wall of the housing by first radial clearance, and the movable vane extend from the wall to a movable free end spaced apart from the output arrangement by second radial clearance.

9. The actuator according to claim 3 wherein the fluid damper device includes at least two stationary vanes and at least two movable vanes, each movable vane being arranged between two stationary vanes in azimuth relative to the axis of rotation, and each stationary vane being arranged between two movable vanes in azimuth relative to the axis of rotation.

10. The actuator according to claim 2 wherein the housing comprises a hub closed by a cover.

11. The actuator according to claim 2 wherein the output lever comprises at least one arm secured to the housing.

12. An actuator according to claim 2 wherein the fusible connection comprises a fusible pin inserted in a first passage in the output arrangement, the pin being inserted in a second passage in the housing.

13. A vehicle wherein the vehicle includes the actuator according to claim 1.

14. The vehicle according to claim 13 wherein the actuator is connected to a flight control linkage that extends from a pilot-operable flight control to a control member of the vehicle, movement of the control member under drive from the flight control giving rise to movement of the vehicle.

15. An actuator comprising a motor for moving an output arrangement, the actuator comprising an output lever and a fusible connection that is operable to constrain the output arrangement and the output lever to move together in rotation about an axis of rotation; the actuator comprising a fluid damper device disposed between the output lever and the output arrangement that, following rupture of the fusible connection, dampens movement of the output lever relative to the output arrangement in rotation about the axis of rotation.

16. The actuator according to claim 15 wherein the actuator comprises a leaktight chamber filled with a fluid of the fluid damper device, the chamber extending radially relative to the axis of rotation between the output arrangement and a wall of a housing of the output lever.

17. The actuator according to claim 16 wherein the fluid damper device comprises at least one stationary vane constrained to move in rotation with the output arrangement, and at least one movable vane constrained to move in rotation with the housing, the stationary vane and the movable vane being arranged in the chamber immersed in the fluid.

18. The actuator according to claim 17 wherein the stationary vane is disposed in a slot of the output arrangement.

19. The actuator according to claim 17 wherein the stationary vane and/or the movable vane include at least one opening passing through it, the fluid passing through the opening in the event of the output lever turning relative to the output arrangement.

20. The actuator according to claim 19 wherein the opening passes through the movable vane or the stationary vane in a direction that is tangential to a circle centered on the axis of rotation.

* * * * *